Patented July 2, 1946

2,403,423

UNITED STATES PATENT OFFICE 2,403,423

PAINT

Paul Zurcher, Ponca City, Okla., assignor to Continental Oil Company, Ponca City, Okla., a corporation of Delaware No Drawing. Application June 26, 1943,
Serial No. 492,447

4 Claims. (Cl. 106—263)

My invention relates broadly to paints and more particularly to a paint containing a halogenated organic compound and an amine.

This application is a continuation-in-part of my co-pending application Serial No. 368,227, filed December 2, 1940, which in turn, is a continuation-in-part of my co-pending applications Serial No. 296,445, filed September 25, 1939, and Serial No. 333,606, filed May 6, 1940, the latter being a continuation-in-part of application Serial No. 175,775, filed November 22, 1937.

The word "paint" as used in this specification and in the appended claims, means any composition, which when spread in a thin film, dries or polymerizes into a tough, elastic film in a relatively short time. Paint compositions, so defined, consist either of a vehicle, or a combination of a vehicle and a pigment. It is necessary that the paints be non-aqueous because the amines are immediately converted to ammonium bases in the presence of water and in the converted state are no longer efficacious to improve the paint.

The vehicle may be any drying vegetable oil, such as linseed oil, tung oil, oiticica oil, or perilla oil; it may consist of a solution of natural or synthetic resins, including chlorinated rubber in suitable solvents; it may be a combination of the above two classes; or it may be a solution of cellulose acetate or cellulose nitrate. All of the above vehicles possess the common characteristic that they form a hard, dry, elastic film after being spread on a surface. This is true although the cause of drying may be different. The vehicles may dry with or without catalysts, by oxidation, polymerization, or both, or by simple evaporation of a volatile solvent.

Pigments are defined as the fine solid particles used in the preparation of paints and substantially insoluble in the vehicle. I do not consider asphaltic materials from any source as pigments.

In my first application Serial No. 175,775, filed November 22, 1937, I disclose broadly that halogenated organic compounds when added to a paint in small amounts will improve the physical and chemical qualities of the paint film.

In my copending application Serial No. 296,445, filed September 25, 1939, I disclose the beneficial and improved results obtained from the addition to a paint of an amine.

I have now discovered that if small amounts of both a halogenated organic compound and an amine are dissolved in the paint vehicle, unexpected and improved results are obtained that are not achieved by either of these compounds alone. The individual advantages obtained by each compound are, of course, still obtained.

I am aware of the fact that others have incorporated protective and volatile toxic chemicals into paints by combining the chemicals under enormous pressure with the paint pigments. However, in this case, the additives have no influence on the physical or chemical properties of the liquid paints nor do they change the film after it has dried. When thus incorporated into the paint the chemicals act entirely differently than when dissolved by the vehicle and are intended only to protect the covered surface after the paint film has ruptured. Until this occurs they are merely held as inert constituents of the paint.

When the amines alone are added to a paint they frequently so increase the viscosity of the paint that it can no longer be easily applied or brushed onto a surface. On the other hand, the addition of a halogenated organic compound frequently so reduces the viscosity of the paint that it no longer has the requisite hiding power. Furthermore, many halogenated organic compounds have the undesirable property of accelerating the formation of a tough surface skin during storage of the paint.

I have found that the harmful effects of both classes of additives can be eliminated if the thinning tendency of the halogenated organic compounds is counteracted by the thickening tendency of the amines. Also, when these two classes of compounds are added together the amines have the unexpected property of inhibiting skin formation caused during storage by the halogenated organic compound. Moreover, by adding both classes of compounds together, I can produce a paint having greater durability, luster, depth of color, and elasticity. At the same time, I do not impair but improve the hiding power of the paint. Furthermore, I find that both of the compounds eliminate completely such serious defects of the paint film as checking or peeling, although neither alone will eliminate or improve these defects.

By halogenated organic compounds, I mean organic compounds having a vapor pressure of less than atmospheric at 170° F., containing halogen, carbon, generally hydrogen and permissively oxygen and other elements. The preferred compounds are halogenated aliphatic esters and halogenated waxes. However, the esters may be aliphatic, aromatic or heterocyclic. The less complex, i. e., the aliphatic and lower molecular weight esters, are generally preferred, although the more complex esters, i. e., the higher molecular weight and the aromatic and heterocyclic esters, are effective when the paint is very thin. As a general rule, halogenated compounds containing one or more benzene rings increase the viscosity of the paint.

The second component of this invention, the amine, may be any organic compound having the amine radical. The amine may be primary, secondary, or tertiary. The $NH_2$ radical may be present, as such, or one or both of the hydrogens may be replaced by organic radicals which may be aliphatic, aromatic, or heterocyclic. The amines may contain other elements in addition to carbon, hydrogen and nitrogen. In fact, the presence of oxygen seems to improve the beneficial activity of the amine in many cases. In general, I prefer not to use amines of low flash point because of their toxicity. The following examples are, of course, not inclusive; they are, however, representative of suitable amines within the above general definition:

1. Dibutyl amine
2. Tributyl amine
3. Diamyl amine
4. Triamyl amine
5. Diethyl-amino ethanol
6. Di-n-butyl-amino ethanol
7. Dipropyl-ethanol amine
8. Aniline
9. Ortho-toluidine
10. Meta-toluidine
11. Para-toluidine
12. Xylidines
13. Monomethyl aniline
14. Para-phenylene diamine
15. Pyridine The amounts of the amines and of the halogenated organic compounds that must be added to secure the desired changes are small in comparison to their effect. A decided influence on the viscosity of the paint is evident when as little as .001 per cent of one of the classes of compounds is present. I have been unable to find a lower limit. The upper limit is easily discerned by various adverse effects on the properties of the paints. For example, an excess of the compounds causes increased drying time, objectionable odor, dull spots, and a film of reduced durability. These undesirable properties are easily detected. While it is to be understood that certain compounds can be added in larger amounts than other similar or related compounds without adversely affecting the paint; as a general rule, between 0.1 per cent and 2.5 per cent of each of the two additives is the range within which favorable results are obtained.

Of course, different members of the two classes of compounds may improve or affect different properties in a paint. The same member may act differently in different paints. However, the desired result can be achieved by a judicious selection of the additives based on an examination and knowledge of the base paint. The following examples demonstrate the joint effect of an amine and a halogenated organic compound on different properties of paints.

*Example 1.*—The effect on the viscosity of a paint by the addition of an amine and a halogenated organic compound is shown in this example. All viscosity determinations were made with a Ford viscosity cup having a No. 4 orifice and at a temperature of 75° Fahrenheit. A heavy black primer paint consisting of black iron oxide, carbon black, and red lead as pigments, and linseed oil, thinner and drier as vehicle was selected. The viscosity of this paint was 136. The same paint plus one per cent methyl dichlorostearate alone had a viscosity of 104, while the same paint plus 0.4 per cent triamyl amine alone had a viscosity of 92. When one per cent methyl dichlorostearate and 0.4 per cent triamyl amine were both added to the paint its viscosity was reduced to 85.

The above illustrates the manner in which the viscosity of an extremely heavy paint can be changed at will by the judicious selection of additives embodying the invention without dilution by oil or the use of a thinner. Thus, by using the additives the paint can be made to flow easily without appreciably affecting its composition.

*Example 2.*—The following test further illustrates the manner in which the viscosity of a paint can be controlled by judiciously selecting the additives for a particular paint. An exterior paint containing 63 per cent pigment (titanium dioxide and zinc oxide) and 37 per cent vehicle (linseed oil and drier) was used in this test. When this paint was diluted with linseed oil in the proportion of 4:1, it had a viscosity of 49. The addition of one and one-half per cent methyl dichlorostearate further reduced the viscosity of the paint to 45, making it too thin for brushing, while the addition of one-half of one per cent of diethanol amine increased the viscosity of the paint to 55 rendering it too sticky. The combined action of the two compounds brought the viscosity of the paint back to 49, and at the same time, materially improved the flow and brushability of the original paint.

The addition of chlorinated wax and diethanol amine in the same proportions as the above, raised the viscosity of the paint to 51, and improved its hiding power.

One-half per cent of diethanol amine and one and one-half per cent of chlorophenyl mercaptan, dichlorophenyl oxide, pentachloro benzene, and pentachloro-phenyl benzoate changed the viscosity of the paint to 68, 62, 55 and 70, respectively.

Other effects of the combination of a halogenated compound and an amine are shown in the following examples:

*Example 3.*—This test shows the effect of the additives upon skin formation. A synthetic green enamel was selected which consisted of 14.5 per cent pigment (chrome green) and 85.5 per cent vehicle (glycerol phthalic resin solution). After storage for one week this paint had formed a skin on its surface. Another sample of the same paint, containing one per cent by weight of methyl dichlorostearate, also formed a skin after one week's storage. A third sample of the same synthetic enamel, containing one per cent by weight of chlorinated China-wood oil, formed a very heavy skin in the same time. To determine the effect of an amine on the above points, each of the three samples was divided into four portions. One per cent tri-ethanol amine was added to one portion of each sample, one per cent diethanol amine was added to the second portions of the samples, one per cent diamyl amine was added to the third portions of the same and one per cent triamyl amine was added to the fourth portions thereof. Each portion of the first sample, i. e., the paint containing an amine but no halogenated organic compound, continued to form a surface skin as before; however, the samples containing the amines in addition to the halogenated compounds developed no skinning whatever after one month's storage. This result is unexpected. Samples containing a halogenated organic compound, alone, and samples containing an amine, alone, soon formed a surface skin during storage. However, the samples containing both of these additives formed no surface skin even after storage for a considerable length of time.

*Example 4.*—This test further illustrates the effect of the two additives on the skin forming tendency of paints. A white oil-base enamel in which the vehicle comprises a mixture of China-wood oil, linseed oil, resins and drier, and the pigment was a mixture of titanium dioxide and zinc oxide, developed a surface skin within two weeks of storage. The same enamel with one per cent methyl dichlorostearate formed a heavier skin. The same enamel with one per cent chlorinated China-wood oil formed a skin within a few hours; and, after two weeks, the skin was a hard, hornlike texture. Samples of the enamel containing one per cent chlorinated China-wood oil and of the enamel containing one per cent methyl dichlorostearate were prepared with a further addition of one per cent by weight of diethyl-amino ethanol. After two weeks of storage, no skin had formed in the containers. To one of the above two samples an additional 1½ per cent of chlorinated China-wood oil was added. This sample showed a rapid tendency to form a skin; however, with the further addition of one per cent diethyl-amino ethanol, the skin forming tendency was completely inhibited.

*Example 5.*—This test was conducted to determine the effect of the additives on the physical properties of the paint film. A black enamel was selected having the following composition: Pigment 3.6 per cent (carbon black) and vehicle 96.4 per cent (linseed oil 31.1 per cent; China-wood oil 10.4 per cent; resins, mineral spirits, turpentine and drier 58.8 per cent). One panel was coated with a sample of the enamel to which no additives had been added. A second panel was coated with a sample of the enamel to which had been added one per cent of methyl dichlorostearate. A third panel was coated with a sample of the enamel to which had been added 0.5 per cent tributyl amine, and a fourth panel was coated with a sample of the enamel containing one per cent methyl dichlorostearate and 0.5 per cent tributyl amine. All four of these panels were placed in an accelerated weathering machine and subjected to conditions corresponding to two years exposure to the atmosphere. At the end of the testing period, the following results were observed.

The film containing no addition, the film containing one per cent of methyl dichlorostearate and the film containing 0.5 per cent of tributyl amine, all had the undesirable golden-purple hue known to the trade as bronzing, while the film containing one per cent methyl dichlorostearate plus 0.5 per cent tributyl amine was perfectly black.

After the chalk had been wiped from the film surfaces, the films showed drastic differences. The film containing no additive was badly cracked on its whole surface. The film containing one per cent of methyl dichlorostearate was so severely checked that it was partly disintegrated. In the latter film the pattern of the checks had been changed from an irregular network to parallel straight lines. The addition of 0.5 per cent tributyl amine had no apparent effect on the checking since the amine containing film looked very similar to the one containing no additives. On the other hand, the film containing one per cent methyl dichlorostearate and 0.5 per cent tributyl amine was by far the best preserved although exposed to weathering fifty per cent longer than the other three films. A few very fine, disconnected hair checks could be detected only with a magnifying glass.

*Example 6.*—The effect on the physical properties of the paint film by the addition of my additives is further brought out by the following example. A paint was selected comprising a red iron oxide suspended in a vehicle consisting of linseed oil, a thinner, and a drier. This paint was defective in that it had a tendency to detach itself from the coated surface. Four panels were prepared, one being coated with a sample of the paint containing no additives, the second being coated with a sample of the paint containing 0.5 per cent methyl dichlorostearate, the third being coated with a sample of the paint containing 0.4 per cent of aniline and the fourth being coated with a sample of the paint containing 0.5 per cent of methyl dichlorostearate and 0.4 per cent of aniline. Two coats of each paint sample was sprayed on its respective panel. For comparative purposes, four additional panels were prepared, each panel having one coat of a respective one of the above paint samples brushed thereon. The first set of panels having two coats of paint were subjected to accelerated weathering for 490 hours. The second set of single-coated panels were exposed to atmospheric weathering for 123 days. Both sets of panels gave identical results, the ones exposed to atmospheric weathering being more pronounced because of the single coat. In both sets of panels the films without additions were full of pinholes. Moreover, much of the paint had fallen from the surface of the single coated panel. The films containing 0.5 per cent methyl dichlorostearate only, and the films containing aniline only were even more deteriorated than the above films. It is significant, therefore, that both panels coated with paint containing 0.5 per cent methyl dichlorostearate and 0.4 per cent aniline showed no evidence of pinholes or loosening of the paint film.

It is believed that the above examples clearly establish that new and unexpected results are achieved when both a halogenated organic compound and an amine are added to a paint. Similar tests made with different paints and with varnishes and lacquers all yield similar results. Depending on the nature and proportions of the additives, the gloss, flow, durability, and hiding power of the paints were also favorably affected.

Apparently, the two classes of additives have a direct and immediate effect on the physical properties of any liquid non-aqueous paint compositions. The flowing properties are changed, pigment dispersion is increased; and, when spread out, the tinting strength of the pigment is improved and the dry films have better adhesion to the surface, as well as greater durability and higher surface gloss.

Having thus described my invention, I claim:

1. A non-aqueous paint comprising a drying oil vehicle having the characteristics of forming a hard, dry elastic film after being applied to a surface, said vehicle having added thereto methyl dichlorostearate in amounts ranging from about .001 per cent to about 2.5 per cent of the paint composition, said paint also including a high flash point amine from the group consisting of tri-ethanol amine, diethanol amine, triamyl amine, tributyl amine and aniline to reduce the skin forming tendency of the paint, said amine being present in amounts ranging from about 0.1 per cent to about 2.5 per cent of the paint composition.

2. A paint as set forth in claim 1 in which the amine is tri-amyl amine.

3. A paint as set forth in claim 1 in which the amine is tri-ethanol amine.

4. A paint as set forth in claim 1 in which the amine is aniline.

PAUL ZURCHER.